(12) United States Patent
Doetsch et al.

(10) Patent No.: US 7,488,439 B2
(45) Date of Patent: Feb. 10, 2009

(54) METHOD FOR PRODUCING DUST-FREE ALKALINE EARTH PEROXIDES

(75) Inventors: Werner Doetsch, Linz a. Rhein (DE); Ernst Buchholz, Vettelschoss (DE)

(73) Assignee: Solvay Chemicals GmbH, Hannover (DE)

( * ) Notice: Subject to any disclaimer, the term of this patent is extended or adjusted under 35 U.S.C. 154(b) by 579 days.

(21) Appl. No.: 11/107,784

(22) Filed: Apr. 18, 2005

(65) Prior Publication Data

US 2005/0239679 A1 Oct. 27, 2005

Related U.S. Application Data

(63) Continuation of application No. PCT/EP03/10618, filed on Sep. 24, 2003.

(30) Foreign Application Priority Data

Oct. 18, 2002 (DE) ................. 102 48 652

(51) Int. Cl.
| | |
|---|---|
| B29B 9/08 | (2006.01) |
| B29C 67/02 | (2006.01) |
| C09C 1/02 | (2006.01) |
| C01B 15/043 | (2006.01) |
| C11D 3/39 | (2006.01) |

(52) U.S. Cl. ............. 264/117; 264/118; 264/109; 252/186.27; 252/186.32; 252/186.43; 252/88.1; 252/8.81; 510/446; 510/445

(58) Field of Classification Search ......... 264/117
See application file for complete search history.

(56) References Cited

U.S. PATENT DOCUMENTS

| | | | | |
|---|---|---|---|---|
| 2,288,410 A | * | 6/1942 | Lippman, Jr. ............. 426/539 |
| 3,490,742 A | * | 1/1970 | Short et al. ............... 424/464 |
| 3,984,342 A | | 10/1976 | Hall et al. |
| 4,293,426 A | | 10/1981 | Gago |
| 4,405,486 A | | 9/1983 | Eoga |
| 4,421,669 A | | 12/1983 | Brichard |
| 4,601,866 A | * | 7/1986 | David et al. .............. 264/109 |
| 4,711,777 A | * | 12/1987 | Tan et al. ................. 514/158 |
| 4,774,083 A | * | 9/1988 | Tan et al. ............... 424/78.11 |
| 4,865,849 A | * | 9/1989 | Conte et al. .............. 424/466 |
| 4,971,782 A | * | 11/1990 | Rudy et al. ................ 424/53 |
| 5,399,328 A | | 3/1995 | Doetsch et al. |
| 5,690,913 A | * | 11/1997 | Hsu et al. ................. 424/53 |
| 6,117,430 A | * | 9/2000 | Joseph .................... 424/745 |
| 6,193,776 B1 | | 2/2001 | Doetsch et al. |
| 6,296,875 B1 | * | 10/2001 | Makino et al. ............ 424/475 |
| 6,358,526 B1 | * | 3/2002 | Mergens et al. .......... 424/464 |
| 6,858,725 B1 | * | 2/2005 | Vladyka et al. ........... 536/56 |
| 2001/0014340 A1 | * | 8/2001 | Ohta et al. ............... 424/400 |
| 2001/0014352 A1 | * | 8/2001 | Batra et al. .............. 424/464 |
| 2005/0147672 A1 | * | 7/2005 | Ohmori et al. ........... 424/464 |

FOREIGN PATENT DOCUMENTS

| | | |
|---|---|---|
| DE | 29 18 137 A1 | 11/1980 |
| DE | 196 50 686 A1 | 6/1998 |
| EP | 0 583 767 B1 | 2/1994 |
| EP | 0 574 696 B1 | 7/1996 |
| GB | 2048842 | 12/1980 |

\* cited by examiner

Primary Examiner—Joseph D Anthony
(74) Attorney, Agent, or Firm—Crowell & Moring LLP

(57) ABSTRACT

Dust-free alkaline earth peroxides are obtained by mixing alkaline earth peroxides with a compacting aid and dry-compacted in a compactor, for example, a roller press. Examples of suitably useful compacting aids include sodium bicarbonate, cellulose, magnesium montanate and cross-linked silicone compounds.

7 Claims, No Drawings

METHOD FOR PRODUCING DUST-FREE ALKALINE EARTH PEROXIDES

CROSS REFERENCE TO RELATED APPLICATIONS

This application is a continuation of international patent application no. PCT/EP2003/010618, filed Sep. 24, 2003, designating the United States of America, and published in German as WO 2004/035470 on Apr. 29, 2004, the entire disclosure of which is incorporated herein by reference. Priority is claimed based on Federal Republic of Germany patent application no. DE 102 48 652.2, filed Oct. 18, 2002.

BACKGROUND OF THE INVENTION

The present invention relates to a method for producing agglomerates, which are comprised of alkaline earth peroxide and for which the alkaline earth peroxide primary particles are subjected to a compressive agglomeration. Furthermore, the invention relates to the alkaline earth peroxide agglomerates obtainable by this method, and to the alkaline earth peroxide granulates obtainable therefrom.

Alkaline earth peroxides are understood to be essentially products such as magnesium peroxide, calcium peroxide and barium peroxide, as well as zinc peroxide, which is chemically related to the products listed. The production of these peroxides is known in the art. For example, German patent no. DE 29 18 137 and U.S. Pat. No. 6,193,776 (=DE 196 50 686) describe the production of peroxides by spray drying the respective, concentrated suspensions, which are obtained from the reaction of hydrogen peroxide with the corresponding oxides or hydroxides.

The techniques described above produce alkaline earth peroxides which correspond to a particle diameter of 1-10 µm and accordingly are finely divided. Because they are so finely divided, the alkaline earth peroxides tend to form dust, which is associated with serious disadvantages during the further processing of the alkaline earth peroxides in the various applications.

SUMMARY OF THE INVENTION

It was therefore an object of the invention to provide an improved method of producing largely dust-free alkaline earth peroxide agglomerates.

A further object of the invention is to provide a largely dust-free alkaline earth peroxide agglomerate which has the advantageous properties of the finely divided starting material in subsequent applications.

Another object of the invention is to provide a largely-dust free alkaline earth peroxide agglomerate which can be adapted with regard to its chemical properties.

These and other objects of the invention are achieved by providing a method of producing a dust-free alkaline earth peroxide agglomerate comprising compacting a dry alkaline earth peroxide to which a compacting aid having disintegrating or hydrophobic properties has been added, wherein said compacting is effected under the application of pressure in a compression zone of a press while simultaneously applying a reduced ambient pressure in the compression zone.

In accordance with a further aspect of the invention, the objects are achieved by providing a dust-free alkaline earth peroxide agglomerate produced by the aforedescribed method.

The present invention thus relates to a method for producing alkaline earth peroxide agglomerates, which is characterized in that finely divided alkaline earth peroxides, produced by known methods, are compressed by press agglomeration in the presence of compacting aids, which have disintegrating or hydrophobic properties, and the resulting agglomerated alkaline earth peroxide is comminuted into the form of a granulate with the desired particle size.

Starting materials for the present invention can be produced by the method described in U.S. Pat. No. 6,193,776, which is incorporated by reference herein.

In accordance with the method of the invention, alkaline earth peroxides, to which compacting aids have been added, are subjected to a compression process and, under the action of a pressure employed for this purpose, are compressed in the compression zone, in which a vacuum exists at the same time. In this way, the desired agglomeration is brought about. Since this agglomeration comes about due to pressure, this process is referred to as a press or pressure granulation. Additives, suitable for a later application, may be added to the alkaline earth peroxides, which are to be compressed.

The compacting aid advantageously is used in an amount of 0.1 to 10% by weight, based on the finished product. Preferably, the compacting aid is used in an amount of from 1 to 5% by weight.

Although it is known in the art to agglomerate crystalline materials, such as sodium perborate monohydrate, the agglomeration of finely divided alkaline earth peroxides is new. Surprisingly, it has been found that, depending on the compacting aid added, agglomerates, which are dust-free in comparison to the starting material, could be produced by pressure granulation and, in addition, depending on the compacting aid selected, have clearly different application properties.

In cases, in which the compacted alkaline earth peroxide is to retain, as far as possible, the application properties of the starting peroxide in an aqueous suspension, materials come into consideration as compacting aids, which have disintegrating properties, such as sodium bicarbonate, cross-linked silicone compounds and cellulose compounds.

In cases, in which a delayed release of oxygen is desired, compacting aids with hydrophobic properties, such as salts of long-chain fatty acids, can be used. A particularly preferred hydrophobic compacting aid is magnesium montanate.

The compacted alkaline earth peroxides, produced in these two ways, can be used either directly as a particulate material, or in a slurry. If used directly as a particulate material, the dust burden to be anticipated will be distinctly less than that of the starting material. If used as a slurry, because of the presence of the disintegrating aid, only very little energy need be expended to re-suspend the alkaline earth peroxide in the slurry liquid.

The temperature range, in which the inventive press agglomeration method can be carried out, preferably corresponds to the temperature range, in which the alkaline earth peroxides used have a high thermal stability and the method can be carried out without problems from a safety point of view. For example, in an advantageous embodiment of the invention, the press agglomeration of the very small particles of alkaline earth peroxide is carried out at temperatures between about 0° and 60° C. Preferably the press agglomeration is carried out at a temperature between 20° and 60° C. In these ranges, the method can be carried out without problems with regard to the active oxygen content of the alkaline earth peroxide particles, which are to be pressed. Product-affecting losses of active oxygen are not observed.

The method preferably is carried out under reduced pressure. Advantageously, the maximum pressure is 0.25 bar.

The press pressure, which is to be applied for achieving the advantages of the invention, as well as the reduced pressure, which is to be employed, can be selected freely within wide limits and can therefore be adapted to the special wishes or requirements with regard to the product. The lower values of the press pressure are, however, co-determined by two requirements; the minimum press pressure to be applied should be sufficient to endow the agglomerate of the alkaline earth primary particles with a sufficient strength, in order to avoid bothersome dust in the later application. The minimum press pressure, to be employed for achieving the desired properties, depends on the nature of the press used and can, with respect to the product properties desired, easily be determined in a few preliminary experiments by someone having ordinary skill in the art. The upper limit of the press pressure to be applied is not critical and is limited only by the technically maximum press pressure, achievable by or permissible for the equipment used for the press agglomeration. In a roll press, for example, the primary alkaline earth particles may be compressed, for example, at press pressures of at least 1.5 ton to 2.5 ton per centimeter of roll length (~95 to 165 bar). In a preferred variation, the compression is carried out at press pressures of about 2.35 ton per centimeter of roll length (~145 bar). At the same time, there should be an air pressure of not more than 0.25 bar in the compression zone of the press machine; in other words, the work is carried out under reduced pressure or vacuum.

The agglomerates, produced pursuant to the invention, may be shaped products, such as tablets or agglomerate fill, such as granulates, which, in use, have a lesser tendency to stick together or form dust and can therefore be metered out well. The physical properties, such as the shape of the agglomerates or the size of the granulate can be adapted to the requirements equally well, as can the application properties described above. The compacting method to be used can be selected by a person skilled in the art depending on the desired properties of the product to be produced.

In principle, all conventional press agglomeration equipment can be used for the method of the invention. Suitable press agglomeration devices include, for example, molding presses, stamping presses or roll presses. Depending on the press agglomeration equipment used, the primary particles are pressed under compressive pressure into defined shapes, such as tablets or dense scabs, while at the same time there is a vacuum in the compression zone. The scabs are then comminuted into granulates of the desired size.

In particularly advantageous embodiments of the method of the invention, roll presses are used. If the products, obtained by press agglomeration, do not already have the final product shape, the resulting scabs can be comminuted with the help of granulators (granulating screens).

In comparison to the very finely divided starting material, the inventive alkaline earth peroxide granulate is distinguished by the fact that it can be metered well and, at the same time, is essentially dust-free. Moreover, depending on the compacting aid, the alkaline earth peroxide granulate can be re-suspended very easily or, when in granular form and having hydrophobic properties, with difficulty, in which case the oxygen emission is retarded.

It can be seen that the present invention provides a simple method for producing dust-free alkaline earth peroxide granulates.

The following examples are intended to illustrate the method of the invention in further detail without limiting its scope.

EXAMPLES

Example 1

Alkaline earth peroxides, prepared according to the teachings of German patents 29 18 137 and 196 50 686, are mixed with additives such as magnesium montanate (producer: Fa. Clariant, D-86368 Gersthofen), Arbocell (type TF 0406, a fibrous cellulose, producer: Fa. J. Rettenmaier und Söhne, D-73494 Rosenberg) or sodium bicarbonate, and supplied to a slightly structured roll press to be press granulated. The primary particles were pressed at a pressure of from 2 ton per cm of roll length (~130 bar) to 2.35 ton per cm of roll length (~145 bar) and under a vacuum of 0.75 bar (i.e., at a pressure of 0.25 bar) into scabs 1 mm thick and subsequently adjusted to the intended particle size by granulating screens with the aid of a breaker.

The experimental results are given in the following Table 1. Percentages are expressed in terms of percent by weight.

Example 2

In order to investigate the disintegration, 50 g of alkaline earth peroxide granulate were stirred for 10 minutes at 350 rpm in 250 milliliters of water in a standard 500 milliliter beaker with a stainless steel stirrer having two vertical blades, 42 mm long and 11 mm wide, the stirrer blades being mounted centrally 1 cm above the bottom of the beaker. The disintegration is expressed as the proportion of the material in weight percent which passes through a 400 μm screen.

Evaluation: analytical values of more than 55% indicate a high degree of disintegration.

The results are given in the following Table 1.

Example 3

In order to determine the attrition number, a 70 g sample was screened manually to remove fines. Subsequently, precisely 50 g were shaken on the appropriate screen (1.0 mm) for 3 minutes using the JEL laboratory screen shaker. The resulting fines <0.425 mm in % indicated the attrition.

Evaluation: If the analytical values are <20%, the attrition resistance of the compacted products is acceptable.

TABLE 1

| Product | Compacting Aid | Compacting Aid (%) | Attrition (%) | Disintegration (%) |
| --- | --- | --- | --- | --- |
| IXPER ® 75C | Mg Montanate | 2 | 19.8 | 25.6 |
|  |  | 5 | 12.0 | 23.5 |
|  | NaHCO$_3$ | 1 | 23.1 | 54.0 |
|  |  | 3 | 7.7 | 59.0 |
|  |  | 5 | 7.2 | 62.0 |
|  | Arbocell | 4 | 8.4 | 59.6 |
| IXPER ® 35M | Mg Montanate | 2 | 17.9 | 24.6 |
|  |  | 5 | 16.4 | 18.9 |
|  | NaHCO$_3$ | 1 | 22.9 | 52.2 |
|  |  | 2 | 18.0 | 55.7 |
|  |  | 4 | 14.2 | 60.2 |
|  | Arbocell | 5 | 16.7 | 58.6 |

IXPER ® 75C is a product of the Solvay Interox GmbH with at least 75% by weight of calcium peroxide.
IXPER ® 35M is a product of the Solvay Interox GmbH with at least 35% by weight of magnesium peroxide.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of producing a dust-free alkaline earth metal peroxide agglomerate comprising compacting a dry alkaline earth metal peroxide to which a compacting aid having disintegrating or hydrophobic properties has been added, wherein said compacting is effected under the application of a press pressure in a compression zone of a press while simultaneously applying a reduced ambient air pressure in said compression zone.

2. A method according to claim 1, wherein the compacting is carried out at a press pressure of 95 to 165 bar and an ambient pressure of at most 0.25 bar in the compression zone.

3. A method according to claim 1, wherein the compacting is carried out at a temperature of 0° C. to 60° C.

4. A method according to claim 1, wherein the compacting aid is selected from the group consisting of sodium bicarbonate, cross-linked silicone compounds, cellulose compounds and magnesium salts of long-chain fatty acids.

5. A method according to claim 4, wherein the compacting aid comprises magnesium montanate.

6. A method according to claim 1, wherein the alkaline earth peroxide is treated with from 0.1 to 10% by weight of said compacting aid, based on the weight of the finished product.

7. A method according to claim 6, wherein from 1 to 5% by weight of compacting aid is used.

* * * * *